United States Patent Office 3,230,209
Patented Jan. 18, 1966

3,230,209
COBALTOUS HALIDE-ALUMINIUM-MERCURIC HALIDE OR HYDROGEN HALIDE-AROMATIC SOLVENT REACTION PRODUCT CATALYST FOR THE POLYMERIZATION OF OLEFINS
Frank C. Cesare, Oakland, and Clifford W. Childers, Wayne, N.J., assignors to United States Rubber Company, New York, N.Y., a corporation of New Jersey
No Drawing. Filed Nov. 29, 1961, Ser. No. 155,838
14 Claims. (Cl. 260—94.3)

This invention relates to the polymerization of ethylenically unsaturated hydrocarbons by means of a novel catalyst. More particularly, the invention relates to a new type of catalyst for olefinic polymerization procedures that are carried out in halogenated hydrocarbon solvents, to methods of making said catalysts, to polymerization methods using said catalysts, and to the polymeric products obtained therefrom.

The catalysts of this invention are products obtained from the interaction of a mixture consisting of metallic aluminum, a cobaltous halide, and a hydrogen or mercuric halide in the presence of an aromatic solvent. The catalysts are soluble in halogenated hydrocarbon polymerization solvents and extremely active therein; high molecular weight homopolymers and copolymers of ethylenically unsaturated hydrocarbons are produced at a rapid rate; and large yields of polymers are obtained, even in the presence of very small amounts of catalyst in the polymerization media. Furthermore, by virtue of the catalysts disclosed herein, it is now possible to obtain rubbery copolymers of 1,3-butadiene and ethylenically unsaturated hydrocarbon monoolefins, said copolymers containing polymerized therein from about 60% to about 95% by weight of said butadiene, and correspondingly from about 40% to about 5% by weight of said monoolefin, based on the total weight of copolymer, and in which, more than 80% of the butadiene units are in the cis-configuration.

As the cobaltous halide operable herein, cobaltous chloride, cobaltous bromide and cobaltous iodide are suitable, although cobaltous chloride is preferred. As the hydrogen halide operable herein, hydrogen chloride and hydrogen bromide are preferred. As the mercuric halide operable herein, mercuric chloride and mercuric bromide are preferred.

The metallic aluminum, in finely divided form, the cobaltous halide and the hydrogen or mercuric halide are interacted in the presence of a liquid aromatic solvent which, to some extent, enters into the reaction to form the catalysts of this invention. The solvent is preferably selected from the group consisting of (1) benzene, (2) lower alkylbenzenes, such as toluene, xylene, mesitylene, ethylbenzene, cumene, and the like, and (3) the nuclear monohalo substitution products thereof, such as chlorobenzene, bromobenzene, the ortho-, meta-, and para-chlorotoluenes, and the like. All ingredients, including the solvent, should be dried and freed from impurities (e.g., highly polar compounds such as water, alcohols, hydrogen sulfide, esters, etc.) which interfere with the catalyst-forming reaction. The ingredients are interacted under an inert atmosphere at a temperature ranging from about 20° C. to about 150° C. for a length of time sufficient to insure formation of the catalyst. Generally, from about 5 hours at the lower temperatures to as little as 10 minutes at the higher temperatures will be sufficient. The resulting catalyst, when benzene or an alkylbenzene solvent is used, is a dark-colored, oily product, which separates readily from the solvent. The catalyst, however, is soluble in the third class of solvents described above, to wit, the monohalo aromatic solvents, and, therefore, when these are used as one of the initial ingredients, the resulting catalyst does not separate out but remains dissolved in the non-reacted portion of the solvent. The catalyst-haloaromatic solution may thereafter be used, with or without addition of more haloaromatic solvent, as a polymerization reaction medium.

The catalytically active oils of this invention have been found to be organometallic complexes of (1) aluminum, (2) cobalt, (3) halogen, and (4) free and combined benzene units. The following results were obtained as the average analysis of five different lots of catalytically active oils obtained from the interaction of aluminum, cobaltous chloride and mercuric chloride in the presence of benzene:

Percent Al _____ 6.04
Percent Co _____ 5.91
Percent Cl _____ 25.25
Percent benzene (including $C_6H_6$ and $C_6H_5^-$) ___ 62.62
Percent Hg _____ 0.00

The foregoing data were obtained after hydrolyzing the catalytic oils with an acidic alcohol solution obtained by mixing 200 ml. of 1 normal sulfuric acid in sufficient methanol to make 1 liter. The aluminum content was determined colorimetrically as the Al compound of Eriochrome Cyanine R, a triphenylmethane dye. The cobalt content was determined colorimetrically as the intense blue complex formed with concentrated hydrochloric acid. The chlorine content was determined by titration with silver nitrate. The benzene content was determined from the ultraviolet absorption spectrum, which does not distinguish between free benzene and phenyl groups. The lack of mercury was determined by the absence of a characteristic ultraviolet spectrum upon treatment with diphenyl-thiocarbazone.

The proportions of the ingredients used in making the catalyst may be varied. The amount of solvent is not critical, although at least 25% by weight of solvent in the total reaction mixture is preferred. Based on one molar proportion of the cobaltous halide, the amount of mercuric halide may range from about 0.6 to about 4.0 molar proportions, and the amount of aluminum metal may range from about 0.5 to about 10.0 atomic proportions. When mercuric halide is used in making the catalyst, the amount of aluminum used should preferably be in excess of the stoichiometric amount required to reduce the mercuric halide to metallic mercury, although large excesses of aluminum should be avoided, since it is wasted as a residue, amalgamated with the mercury, on completion of the reaction. When hydrogen halide is used in making the catalyst, the solvent mixture is preferably maintained substantially saturated therewith until the reaction is complete.

Polymerization procedures employing the catalysts of this invention are carried out in inert halogenated hydrocarbons as the polymerization solvents, said solvents having a boiling point of less than 200° C. and preferably less than 150° C. The term, "inert," as used herein, is meant to characterize those solvents which neither polymerize themselves nor interfere with the activity of the polymerization catalyst. Among said halogenated hydrocarbons are the lower alkyl halides, such as methyl chloride, methylene dichloride, ethyl chloride, ethylene dichloride, vinylidene dichloride, and the like; the monohalo- and dihalobenzenes or alkyl substituted benzenes, such as chlorobenzene, dichlorobenzene, chlorotoluene, and the like; and the corresponding bromine and fluorine compounds.

Such solvents, containing a catalytic amount of the subject catalysts dissolved therein, are excellent mediums for the homopolymerization and copolymerization of the ethylenically unsaturated hydrocarbons described more specifically hereinafter. High polymerization rates and catalyst efficiencies are obtained, i.e., high yields of polymer per unit weight of catalyst. It has been found that the minimum amount of catalyst required in the halogenated hydrocarbon solvent for effective polymerization procedures, based on the cobalt content of the catalyst, is at least 0.1 mg. of cobalt in 100 ml. of the solvent, although a catalyst content corresponding to at least 1.0 mg. of cobalt in 100 ml. of solvent is preferred. There is no critical limit on the maximum amount of catalyst that may be used. Non-halogenated hydrocarbon solvents, such as benzene, the alkanes, and the cycloalkanes, dissolve the catalyst very slightly or not at all; polymerization rates and catalyst efficiencies are low; and such solvents by themselves are less useful in the invention. However, mixtures of halogenated hydrocarbon solvents diluted with a minor proportion, generally not more than 10% by weight, of such non-halogenated hydrocarbon solvents are useful with the catalysts of this invention.

The polymerization may be carried out by any of the known methods: e.g., the batch method in which all the ingredients are placed in the reactor at the start, and remain until the desired amount of polymerization has occurred; or the batch method with continuous or intermittent feed of part of the monomers and/or the catalyst; or the continuous method in which a stream of the ingredients is fed continuously into the reactor, and simultaneously a stream of partially polymerized mixture is withdrawn from the reactor. The resulting polymer is recovered from the reaction mixture, in which it is generally soluble, by well-known methods, such as evaporation of the solvent, or precipitation with a liquid, such as water or methanol, which decomposes the catalyst and dissolves most of the catalyst residues.

The polymerization reactions should be conducted under an inert atmosphere, such as dry nitrogen, argon, etc., and the solvent and monomers should be thoroughly dried and freed from materials which might destroy or alter the catalyst, e.g., highly polar materials. The selection of the temperature and pressure used for the polymerization process will obviously depend upon the monomers, the activity and concentration of the catalyst system being used, the degree of polymerization desired, etc. In general, the polymerization will be carried out at room temperature or slightly above, but any temperature within the range of from $-80°$ C. to about $150°$ C. and preferably from about $-50°$ to $100°$ C. may be used. In the same way, while atmospheric pressure or a pressure of only a few pounds may be used, the polymerization may be carried out over a wide range of pressures, as for example, from a partial vacuum to about 1000 atms. and preferably from about 1 to about 10 atms. pressure. Higher pressures may, of course, be used, but generally do not appreciably alter the course of the polymerization.

The concentration of monomers present during the polymerization reaction is not critical and will vary rather widely depending upon the reaction conditions, the particular polymer or copolymer being prepared, the rate of polymerization, the viscosity of the polymerization reaction mixture resulting from formation of polymer, etc. As a general rule however, at least one part by weight of monomer per 100 parts by weight of polymerization solvent containing the catalyst, should be employed.

The ethylenically unsaturated hydrocarbon monomers polymerizable with the aid of the new catalysts disclosed herein preferably contain from 2 to 10 carbon atoms. The resulting polymers have molecular weights greater than 20,000 and generally greater than 100,000. The achievement of extremely high molecular weights does not present a problem employing the catalysts herein described, and molecular weights even greater than 1,000,000 may be obtained. Included among said ethylenically unsaturated hydrocarbon monomers are (1) monoolefins, such as ethylene, propylene, 1-butene, isobutylene, 3-methyl-1-butene, 3,3-dimethyl-1-butene, 4-methyl-1-pentene, 1-octene, 1-decene, styrene, alpha-methylstyrene, vinylcyclohexane and the like, and (2) diolefins, including the conjugated, non-conjugated, and cyclic types, such as 1,3-butadiene, isoprene, 1,3-cyclohexadiene, 1,4-heptadiene, and the like. Mixtures of these monomers are also polymerizable with the catalysts of this invention to give copolymers.

Of particular importance, is the application of the subject catalysts to the polymerization of 1,3-butadiene and mixtures of 1,3-butadiene with compounds polymerizable therewith to form high molecular weight rubbery polymers and copolymers in which the distribution of double bonds is of predominantly the cis-configuration. For example, 1,3-butadiene can be polymerized to polybutadiene having a cis content of from 80 to 99% in high yields. The product is a high molecular weight (over 100,000), rubbery material having an intrinsic viscosity higher than 1.0 in benzene at $30°$ C. Likewise, high molecular weight, rubbery copolymers of butadiene and ethylenically unsaturated monoolefins can now be made containing from 60 to 95 percent by weight of butadiene, and in which at least 80%, and generally from 90 to 99 percent, of the butadiene units have the cis-configuration.

Although butadiene homopolymers having a high proportion of cis double bonds are known, copolymers of butadiene with other ethylenically unsaturated hydrocarbon monomers, as for example, styrene and isobutylene, that have a high cis double bond content have not previously been reported. As an example of the prior art copolymers, commercial styrene-butadiene copolymer rubbers have been obtained by emulsion polymerization procedures which contain from 70 to 75 percent of butadiene by weight, and in which less than 20 percent of the butadiene double bonds have the cis-configuration. It is generally recognized, however, that an increase in the cis-content of such copolymers will result in improvements of certain desirable properties of the rubber and in the cured compositions of said rubber. In particular, in the case of tire tread compositions, the abrasion resistance would be increased, the resilience would be increased, and the heat build-up and hysteresis loss correspondingly decreased, particularly at low temperatures. Cis-polybutadiene is outstandingly good in these respects, but it is very difficult to process. The new butadiene copolymers of this invention, however, are easily processable rubbery materials, and have the above-mentioned advantages over the prior art copolymers of similar monomeric composition due to the high cis-configuration of the butadiene units.

The following examples will serve to illustrate the practice of this invention, without however, limiting the invention thereto or thereby.

*Example 1*

This example illustrates a method of preparing the catalysts of this invention wherein a hydrogen halide is used as one of the reactants.

All reactants and glass apparatus were thoroughly dried and kept in a dry, inert atmosphere before and during the reaction. The aluminum (Al) and cobaltous chloride ($CoCl_2$) were dried in a vacuum oven at $60°$ C. for 48 hours. The benzene was dried by passing it through a column filled with a commercial synthetic zeolite for the selective adsorption of gases and liquids. Anhydrous hydrogen halide (HCl or HBr) from a cylinder was used. The reaction flask was air-dried at $110°$ C. for 24 hours.

(a) Into a 250 ml. flask, adapted with a reflux condenser, were charged 165 ml. of benzene, 1.4 grams (52 millimoles) of Al powder, and 3.0 grams (23.1 millimoles) of $CoCl_2$. The benzene was then saturated with HCl gas, which was passed into the stirred mixture at room temperature, until all the aluminum dissolved. The mixture was then heated under reflux (temperature of about $78°$ C.) for one-half hour. About 12 ml. of a dark orange oil formed, which settled to the bottom of the reaction flask when stirring was stopped. The upper benzene layer was separated from the oil and discarded.

The oil was an excellent catalyst for the polymerization of 1,3-butadiene in halogenated solvents, as illustrated in Example 8.

(b) Following substantially the same procedure described above, 113.5 grams of dry benzene, 1.4 grams (52 millimoles) of Al powder, and 3.0 grams (23 millimoles) of $CoCl_2$ were treated by bubbling about 400 grams of anhydrous hydrogen bromide through the mixture over a period of about 20 minutes. The mixture was then heated at reflux temperature for about 30 minutes. About 14 ml. of a dark brown oil separated out underneath the yellow benzene layer. The oil was active in polymerizing 1,3-butadiene in the presence of a halogenated hydrocarbon solvent to highly cis-polybutadiene of high molecular weight.

Example 2

In this example, the preparation of a catalyst, using mercuric chloride ($HgCl_2$) as one of the reactants, is illustrated.

After thorough drying of the reactants and apparatus, 10 grams (37 millimoles) of $HgCl_2$, 1.0 gram (37 millimoles) of Al powder, 3.0 grams (23 millimoles) of $CoCl_2$, and 150 ml. of benzene were charged into a 250 ml. flask, adapted with a reflux condenser and means for maintaining the reaction flask under a dry nitrogen atmosphere. The contents of the flask were stirred and heated at reflux temperature (about 78° C.) for 2 hours. About 15 ml. of a dark oil, which started to form after about 15 minutes of heating, settled out from the upper benzene layer, and was separated from the latter at the end of the heating period. Analyses of the oil showed the following average composition in percents by weight:

| | |
|---|---|
| Percent Al | 5.87 |
| Percent Co | 6.05 |
| Percent Cl | 25.30 |
| Percent Hg | 0.00 |
| Percent Benzene [1] | 62.00 |

[1] Includes $C_6H_6$ and $C_6H_5^-$; the spectrometric method of analysis used does not distinguish between the two species.

The oil was an excellent catalyst for the polymerization of 1,3-butadiene, as illustrated in Example 7. A catalytic oil may also be prepared, as above, by using toluene or mesitylene in lieu of benzene.

Example 3

A catalyst was prepared by substantially the same procedure described in Example 2, except that 0.7 gram (26 millimoles) of Al powder, 2 grams (15.4 millimoles) of $CoCl_2$, and 7 grams (26 millimoles) of $HgCl_2$ were interacted in 175 ml. of chlorobenzene which had been dried by distillation over calcium hydride. In this case, no oil separated, the active catalytic material remaining dissolved in the chlorobenzene. This solution, containing the active catalyst, was used for polymerizing butadiene to cis-1,4-polybutadiene, as described in Example 9.

Example 4

A catalyst was prepared by substantially the same procedure outlined in Example 2, except that 1.2 grams (44.5 millimoles) of Al powder, 1.7 grams (7.8 millimoles) of $CoBr_2$ and 7.9 grams (22 millimoles) of $HgBr_2$ were interacted in 125 ml. of benzene. The resulting oil was an active catalyst for polymerizing 1,3-butadiene.

Example 5

A catalyst was prepared substantially as described in Example 2, except that 1 gram (37 millimoles) of Al powder, 3 grams (9.6 millimoles) of $CoI_2$ and 9 grams (33 millimoles) of $HgCl_2$ were interacted in 150 ml. of benzene. About 5 ml. of oil was obtained, which was an active catalyst for polymerizing butadiene, as illustrated in Example 10.

Example 6

This example illustrates a method of preparing masterbatch solutions of the catalysts of this invention which may be stored for use over long periods of time without loss of catalytic activity.

Lot #1:
| | Mm. |
|---|---|
| 5.0 g. of Al powder | 185 |
| 15.0 g. of $CoCl_2$ | 115 |
| 45.0 g. of $HgCl_2$ | 156 |
| 150.0 g. of benzene. | |

Lot #2:
| | Mm. |
|---|---|
| 3.4 g. of Al powder | 126 |
| 9.0 g. of $CoCl_2$ | 69 |
| 27.0 g. of $HgCl_2$ | 99 |
| 150.0 g. of benzene. | |

Each of the above two lots was interacted using a procedure substantially as outlined in Example 2. The products of the reaction from both lots were combined; the catalyst oil was separated from the upper benzene layer, and placed in a small, stainless steel tank which had been rinsed with dry benzene, evacuated and dried.

| | Grams |
|---|---|
| Gross weight with oil | 2,980 |
| Tare of tank | 2,780 |
| Weight of oil | 200 |

Dry chlorobenzene was then introduced into the tank in an amount sufficient to give a catalyst solution of a convenient concentration for use in subsequent polymerization experiments.

| | Grams |
|---|---|
| Gross weight with oil and chlorobenzene | 11,133 |
| Tare with oil | 2,980 |
| Weight of chlorobenzene | 8,153 |

The stainless steel tank containing the catalyst oil and chlorobenzene was then placed under 10 p.s.i.g. of nitrogen pressure to prevent any leakage of air, moisture, etc. into the tank. Analysis of the catalyst-chlorobenzene masterbatch showed an average cobalt content of 0.85 mg. per ml. After 3 months, the catalyst showed no decrease in catalytic activity.

(Although two lots of catalytic materials were used in the foregoing example, it is obvious that a masterbatch may be prepared from a single lot as well.)

Example 7

This example illustrates a polymerization procedure for 1,3-butadiene using a catalyst of this invention. 0.1 milliliter of the catalyst oil obtained in Example 2 was dissolved in 200 grams of chlorobenzene to give a solution estimated to contain about 6 mg. of cobalt. This solution was placed in a sealed glass bottle, under dry nitrogen, together with 50 grams of 1,3-butadiene and allowed to stand for 30 minutes. The yield of resulting polybutadiene was 16 grams, which corresponds to about 2700 grams of polymer per gram of cobalt in the polymerization solvent. The polymer was a rubber of good quality and had a molecular weight of more than 100,000. Infrared analysis of the polymer showed the double bonds in the polymer to be predominantly in the cis-configuration (91.2%).

Example 8

This example illustrates the polymerization of butadiene in chlorobenzene with the catalyst prepared in Example 1–a. 12 milliliters of the oil obtained in Example 1–a were dissolved in 175 ml. of dried chlorobenzene to give a catalyst-chlorobenzene solution containing about 4 mg. of cobalt per ml. Twenty grams of 1,3-butadiene were charged, under dry nitrogen, into a sealed glass bottle containing 150 grams of chlorobenzene and 1.4 ml. of the catalyst solution described above. The bottle was allowed to stand for 24 hours. The yield of polybutadiene was 8 grams. Infrared spectra of the resulting polymer showed a cis-configuration of >90%. The molecular weight of the resulting polybutadiene was higher than 100,000.

*Example 9*

This example illustrates a polymerization procedure for 1,3-butadiene using the catalyst prepared in Example 3. Fifty grams of 1,3-butadiene, 150 grams of dried chlorobenzene and 4 ml. of the catalyst solution obtained in Example 3 were sealed in a glass bottle under dry nitrogen and maintained at a temperature of 50° C. for 6 hours. The yield of resulting polybutadiene (85% cis-configuration) was 2 grams; the molecular weight was over 100,000.

*Example 10*

This example illustrates polymerization procedures for 1,3-butadiene using the catalyst prepared in Example 5.

Through a solution under nitrogen of 150 ml. of methylene dichloride containing 1 ml. of the catalyst oil obtained in Example 5, were bubbled 20 grams of butadiene over a period of 10 minutes. The polymerization reaction was then stopped with 50 ml. of methanol containing 1% conc. HCl and 1% PBNA (phenyl-beta-naphthylamine antioxidant). The resulting polybutadiene was a rubber of good quality (intrinsic viscosity in benzene at 30° C.=2.4). The infrared spectrum of the polymer showed a predominantly cis-configuration (95%).

The above procedure was modified in the following manner. Four ml. of the catalyst oil obtained in Example 5 were dissolved in 200 ml. of dried chlorobenzene. Ten ml. of this solution were added to 500 ml. of methylene dichloride, through which 1,3-butadiene was then bubbled for 1¾ hours. The polymerization reaction was then stopped as described above. The resulting polybutadiene was similar to that previously obtained.

*Example 11*

This example illustrates a polymerization procedure for styrene using a catalyst of this invention.

The catalyst used herein was prepared from 1.2 grams of aluminum, 3 grams of CoCl$_2$ and 9 grams of HgCl$_2$ in 150 ml. of benzene by substantially the same procedure outlined in Example 2. Ten milliliters of the resulting oil were then dissolved in 170 ml. of dried chlorobenzene to give a solution containing about 3.55 mg. of cobalt per ml. Six milliliters of this solution were added to 170 ml. of methylene dichloride under an inert atmosphere in a 500 ml. flask, equipped with a stirrer and a dropping funnel. With the temperature initially at 23° C., 49 grams of styrene were added through the dropping funnel over a period of one hour. The temperature rose during the polymerization to a maximum of about 34° C. after 1½ hours. After 3⅓ hours, the reaction was stopped with the methanol solution described in Example 10. The yield of resulting polystyrene was 21 grams.

*Example 12*

This example illustrates a polymerization procedure for propylene using a catalyst of this invention.

Ten ml. of a catalyst oil, prepared substantially according to the procedure outlined in Example 2, were dissolved in 170 ml. of dried chlorobenzene to give a solution containing about 3.5 mg. of cobalt per ml. One ml. of this solution, 100 ml. of chlorobenzene, and 6.3 grams of propylene were placed in a sealed bottle under an inert atmosphere and shaken for 24 hours at room temperature. The polymerization reaction was then stopped with the methanol solution described in Example 10 and 4.5 grams of polypropylene were recovered from the reaction mixture.

*Example 13*

This example illustrates a polymerization procedure for isoprene using a catalyst of this invention.

The catalyst used herein was prepared from 1 gram of Al, 3 grams of CoCl$_2$ and 9 grams of HgCl$_2$ in 150 ml. of benzene by substantially the same procedure outlined in Example 2. Ten milliliters of the resulting oil were then dissolved in 188 ml. of dried chlorobenzene to give a solution containing about 3.15 mg. of cobalt per ml. A sealed bottle, containing 1.2 ml. of this solution, 150 ml. of chlorobenzene, and 25 grams of isoprene, under an inert atmosphere, was shaken for 2 hours at room temperature. The polymerization reaction was then stopped with the methanol solution described in Example 10, and 10 grams of polyisoprene were recovered from the reaction mixture.

*Example 14*

This example illustrates a polymerization procedure for 4-methyl-1-pentene using a catalyst of this invention.

150 milliliters of methylene dichloride, which had been dried by distillation over calcium hydride, and 25 ml. of 4-methyl-1-pentane, which had been dried over a commercial zeolite for the selective adsorption of gases and liquids were added under a nitrogen atmosphere to a 600 ml. bottle and capped with a self-sealing rubber stopper. Two ml. of a chlorobenzene-catalyst solution, containing about 0.75 mg. of cobalt per ml., were injected through the rubber stopper into the sealed bottle by means of a hypodermic needle. The bottle was allowed to stand for 65 hours at room temperature after which time the bottle was opened and the contents poured into 400 ml. of methanol containing 0.5 gram of phenylbetanaphthylamine. About 15 grams of polymer separated out.

*Example 15*

This example illustrates the polymerization of isobutylene using a catalyst of this invention.

The reaction vessel was a dry 1-liter 3-necked flask, equipped with a magnetic stirrer, a thermometer, a dry ice-cooled reflux condenser, and a gas inlet tube; the flask was maintained at about −50° C. during the reaction by means of a Dry Ice-methanol bath. Dry nitrogen was passed into the flask to maintain a pressure slightly above atmospheric. About 356 grams of dry methyl chloride were condensed in the flask, followed by about 63 grams of dry isobutylene. The mixture was stirred, and 12.2 ml. of the catalyst-chlorobenzene solution prepared in Example 6 were added dropwise over a period of several minutes. A white precipitate of polymer formed as each drop of catalyst solution entered the reaction mixture. Immediately following the last addition of catalyst, 20 ml. of methanol containing 1% of PBNA were added to stop the reaction. An additional 1½ liters of methanol were added, and the precipitated polymer was separated from the solvents and dried in a vacuum at 50° C. The yield of 58 grams (over 90% conversion) amounted to about 5600 grams of polymer per gram of cobalt in the catalyst used.

*Example 16*

This example illustrates a polymerization procedure for 1,3-cyclohexadiene using a catalyst of this invention.

To 150 ml. of dried methylene dichloride and 25 grams of 1,3-cyclohexadiene in a sealed bottle were added, under an inert atmosphere, 20 ml. of the catalyst-chlorobenzene solution prepared in Example 6. After 3 hours, the polymerization reaction was stopped in the usual manner by coagulation with a 1% HCl-1% PBNA-methanol solution. Infrared analysis of the resulting polymer showed it to be poly-1,3-cyclohexadiene.

*Example 17*

This example illustrates a procedure for the copolymerization of 1,3-butadiene with styrene using a catalyst of this invention.

A 500 ml. flask, equipped with a stirrer, a dropping funnel and a Dry Ice trap, was charged, under an inert atmosphere, with 125 ml. of dried methylene dichloride, and 5 ml. of the catalyst-chlorobenzene solution (containing 3.55 mg. of cobalt per ml.) that was used in Example 11. To this stirred mixture were added, by means of the dropping funnel, a mixture of 9.6 grams of styrene and 38 grams of 1,3-butadiene over a period of 30 minutes, after which, stirring was continued for an additional 15 minutes. During this time, polymerization occurred and the temperature rose from 25° C. to 35° C. Five grams of a rubbery copolymer of butadiene and styrene were recovered from the reaction mixture. Infrared analysis of the copolymer showed a 15% styrene and 85% butadiene content, in which 80% of the butadiene units were in the cis-configuration.

*Example 18*

This example illustrates a procedure for the copolymerization of 1,3-butadiene with isobutylene using a catalyst of this invention.

Into a dry 1-liter, 3-necked flask, equipped with a magnetic stirrer, a thermometer, a Dry Ice-cooled reflux condenser and a gas inlet tube, were placed 635 grams of dried methylene dichloride under dry nitrogen. 77 grams of a dried mixture of 48% butadiene and 52% isobutylene (by weight) were added, while the flask was kept at −10° C. in a bath of methanol chilled with Dry Ice. Over a period of eight minutes, 17.5 grams of the catalyst-chlorobenzene masterbatch solution prepared in Example 6 were added dropwise. After a period of 10 minutes, the bath temperature was allowed to rise gradually. Twenty-five minutes after the catalyst addition, a temperature differential was noted between the bath at −1.2° C. and the reaction mixture at +2.0° C., showing that a polymerization reaction was occurring. Forty-five minutes after the catalyst addition, the solution became too thick to stir (bath temp. at −2.5° C. and flask temp. at 6.6° C.). Sixty-five minutes after the catalyst addition, the internal temperature of the flask had reached 14.5° C. The ice bath was then removed to avoid a large temperature differential within the reaction medium. One and three-quarter hours after the catalyst addition, the rise in temperature ceased at 31° C. Three and one-half hours after the catalyst addition, the flask was opened and the jelly-like product was removed and diluted with 1¼ liters of benzene containing 10 cc. of methanol and 0.1 gram of phenyl-betanaphthylamine. Further benzene was added to make a thick solution of about 2 liters in volume. A rubbery copolymer of butadiene-isobutylene was then precipitated out by the addition of methanol. After vacuum drying a total yield of 64 grams was obtained, corresponding to about 83% conversion. The intrinsic viscosity of the copolymer was 2.84, measured in benzene at 30° C. Infrared analysis of the copolymer showed 36.7% isobutylene and 63.3% butadiene, in which 92% of the butadiene units were in the cis-configuration.

*Example 19*

This example illustrates the copolymerization of 1,3-butadiene with isobutylene using a catalyst of this invention.

Into a dry 2-liter, 3-necked flask, equipped with a magnetic stirrer, a thermometer, a Dry Ice-cooled reflux condenser, and a gas inlet tube, were placed 1033 grams of dry chlorobenzene. An atmosphere of dry nitrogen was maintained in the flask during this and all subsequent operations. The temperature was maintained between 13° C. and 20° C. throughout the polymerization by means of a cooling bath in which the flask was partially immersed.

48.4 grams of butadiene and 17.3 grams of isobutylene (both of which were purified and dried thoroughly) were introduced into the flask as gases; they dissolved in the chlorobenzene, and were prevented from escaping from the flask by the reflux condenser. 14 milliliters of the catalyst-chlorobenzene masterbatch solution prepared in Example 6 were then added, whereupon polymerization began, as evidenced by a rise in temperature of the reaction mixture. During the ensuing reaction period, additional butadiene and isobutylene were introduced into the flask from time to time in approximately the same proportions as in the initial charge (i.e. about 74% butadiene and 26% isobutylene by weight). Additional catalyst solution was also introduced, 4.7 ml. at a time, at time intervals of 12.5, 32.5, 52.5, 72.5, 92.5 and 112.5 minutes after the initial addition of catalyst. The total amounts of monomers and catalyst were approximately:

| | | |
|---|---|---|
| Butadiene | gm. | 146 |
| Isobutylene | gm. | 52 |
| Catalyst solution | ml. | 42 |
| Cobalt in catalyst | mg. | 36 |

Two hours after the first addition of catalyst, the polymerization was stopped by the addition of 20 ml. of methanol containing 0.2 gram of PBNA. The polymeric product was recovered by precipitating it from the reaction mixture with six volumes of methanol, re-dissolving the precipitate in benzene, and again precipitating it with six volumes of methanol. After drying, the yield was 58.6 grams. The copolymer was a good rubbery material and had an intrinsic viscosity of 2.19 in benzene at 30° C.; its monomeric composition, estimated from the infrared absorption spectrum, was 7% isobutylene and 93% butadiene; 94% of the double bonds due to butadiene monomer units had the cis-configuration.

*Example 20*

This example illustrates a polymerization procedure for the preparation of ethylene-propylene copolymer using a catalyst of this invention.

The catalyst used herein was prepared from 1 gram of Al powder, 3 grams of $CoCl_2$, 9 grams of $HgCl_2$ and 125 ml. of chlorobenzene according to the procedure described in Example 3. The catalyst-chlorobenzene solution thus obtained had a cobalt content of 1.95 mg. per ml.

A 1-liter, 3-necked flask, equipped with stirrer, reflux condenser, thermometer, and gas inlet tube, was charged with 350 ml. of chlorobenzene under an inert atmosphere. An ethylene-propylene mixture (50% by volume of each) was bubbled through at the rate of 2 liters per minute for 10 minutes to saturate the chlorobenzene, after which, 50 ml. of the above catalyst-chlorobenzene solution was added. The feed of monomers was maintained at 2 liters per minute throughout the polymerization reaction. Upon addition of the catalyst, an exotherm was produced, the reaction temperature going from 25° C. to a high of 48.2° C. in 11 minutes. Addition of monomers was discontinued after 40 minutes and the polymerization reaction stopped with 15 ml. of isopropyl alcohol. The yield of ethylene-propylene copolymer that was recovered was 9 grams. Infrared analysis revealed a propylene content of approximately 65%.

Having thus described our invention, what we claim and desire to protect by Letters Patent is:

1. A catalyst for the polymerization of ethylenically unsaturated hydrocarbons having from 2 to 10 carbon atoms, said catalyst being a product obtained from the interaction of a mixture consisting of aluminum metal, a cobaltous halide, a member selected from the group consisting of hydrogen halides and mercuric halides, and an aromatic solvent selected from the group consisting of benzene, alkylbenzene, and the nuclear monohalo substituted products thereof at a temperature between 20° C. and 150° C.; in said mixture, the amount of said aluminum metal ranging from about 0.5 to about 10 atomic proportions based on one molar proportion of said cobaltous halide, the amount of said mercuric halide ranging from about 0.6 to about 4 molar proportions based on one molar proportion of said cobaltous halide, the amount of said hydrogen halide being sufficient to substantially saturate said aromatic solvent throughout said interaction, and the amount of said aromatic solvent being at least 25% by weight of the total reaction mixture, said interaction being continued at least until the formation of a catalytically active oil which is substantially insoluble in benzene and substantially soluble in chlorobenzene.

2. The catalyst of claim 1 wherein said cobaltous halide is selected from the group consisting of cobaltous chloride, cobaltous bromide and cobaltous iodide.

3. The catalyst of claim 1 wherein said hydrogen halide is hydrogen bromide.

4. The catalyst of claim 1 wherein said mercuric halide is mercuric bromide.

5. The catalyst of claim 1 wherein said hydrogen halide is hydrogen chloride.

6. The catalyst of claim 1 wherein said mercuric halide is mercuric chloride.

7. The catalyst of claim 1 wherein said member is a mercuric halide.

8. A process for the polymerization of ethylenically unsaturated hydrocarbons having from 2 to 10 carbon atoms which comprises polymerizing said ethylenically unsaturated hydrocarbons in a halogenated hydrocarbon solvent containing a catalytic amount of a catalyst formed from the interaction of a mixture consisting of aluminum metal, a cobaltous halide, a member selected from the group consisting of hydrogen halide and mercuric halide, and an aromatic solvent selected from the group consisting of benzene, alkylbenzene, and the nuclear monohalo substituted products thereof at a temperature between 20° C. and 150° C.; in said mixture, the amount of said aluminum metal ranging from about 0.5 to about 10 atomic proportions based on one molar proportion of said cobaltous halide, the amount of said mercuric halide ranging from about 0.6 to about 4 molar proportions based on one molar proportion of said cobaltous halide, the amount of said hydrogen halide being sufficient to substantially saturate said aromatic solvent throughout said interaction, and the amount of said aromatic solvent being at least 25% by weight of the total reaction mixture, said interaction being continued at least until the formation of a catalytically active oil which is substantially insoluble in benzene and substantially soluble in chlorobenzene.

9. The process of claim 8 wherein the ethylenically unsaturated hydrocarbon is homopolymerized.

10. The process of claim 9 wherein the ethylenically unsaturated hydrocarbon is selected from the group consisting of butadiene, styrene, propylene, isoprene, 4-methyl-penten, isobutylene, and cyclohexadine.

11. The process of claim 8 wherein the ethylenically unsaturated hydrocarbon is copolymerized with at least one other ethylenically unsaturated hydrocarbon.

12. A process for the polymerization of 1,3-butadiene to rubbery polybutadiene having a cis-configuration of more than 80% which comprises polymerizing said 1,3-butadiene in a halogenated hydrocarbon solvent containing a catalytic amount of a catalyst formed from the interaction of a mixture consisting of aluminum metal, a cobaltous halide, a member selected from the group consisting of hydrogen halide and mercuric halide, and an aromatic solvent selected from the group consisting of benzene, alkylbenzene, and the nuclear monohalo substituted products thereof at a temperature between 20° C. and 150° C.; in said mixture, the amount of said aluminum metal ranging from about 0.5 to about 10 atomic proportions based on one molar proportion of said cobaltous halide, the amount of said mercuric halide ranging from about 0.6 to about 4 molar proportions based on one molar proportion of said cobaltous halide, the amount of said hydrogen halide being sufficient to substantially saturate said aromatic solvent throughout said interaction, and the amount of said aromatic solvent being at least 25% by weight of the total reaction mixture, said interaction being continued at least until the formation of a catalytically active oil which is substantially insoluble in benzene and substantially soluble in chlorobenzene.

13. A process for the polymerization of 1,3-butadiene with a monoolefin hydrocarbon copolymerizable therewith and containing from 2 to 10 carbon atoms to copolymers having a cis-configuration of the butadiene units of more than 80% which comprises copolymerizing said 1,3-butadiene and said monoolefin in a halogenated hydrocarbon solvent containing a catalytic amount of a catalyst formed from the interaction of a mixture consisting of aluminum metal, a cobaltous halide, a member selected from the group consisting of hydrogen halide and mercuric halide, and an aromatic solvent selected from the group consisting of benzene, alkylbenzene, and the nuclear monohalo substituted products thereof at a temperature between 20° C. and 150° C.; in said mixture, the amount of said aluminum metal ranging from about 0.5 to about 10 atomic proportions based on one molar proportion of said cobaltous halide, the amount of said mercuric halide ranging from about 0.6 to about 4 molar proportions based on one molar proportion of said cobaltous halide, the amount of said hydrogen halide being sufficient to substantially saturate said aromatic solvent throughout said interaction, and the amount of said aromatic solvent being at least 25% by weight of the total reaction mixture, said interaction being continued at least until the formation of a catalytically active oil which is substantially insoluble in benzene and substantially soluble in chlorobenzene.

14. The process of claim 13 wherein said monoolefin is a member selected from the group consisting of styrene and isobutylene.

References Cited by the Examiner

UNITED STATES PATENTS

| | | | |
|---|---|---|---|
| 2,898,329 | 8/1959 | Kittleson | 260—94.3 |
| 2,962,488 | 11/1960 | Horne | 260—94.3 |
| 2,977,349 | 3/1961 | Brockway et al. | 260—94.3 |
| 3,066,125 | 11/1962 | Porter et al. | 260—94.3 |
| 3,101,328 | 8/1963 | Edmonds | 260—93.7 |
| 3,111,510 | 11/1963 | Balas | 260—94.3 |

FOREIGN PATENTS

| | | |
|---|---|---|
| 577,120 | 6/1959 | Canada. |
| 1,137,020 | 1/1957 | France. |
| 799,111 | 7/1957 | Great Britain. |
| 866,430 | 4/1961 | Great Britain. |

OTHER REFERENCES

Thomas, Anhydrous Aluminum Chloride in Organic Chemistry, 1941, Reinhold, N.Y., pages 846–48.

JOSEPH L. SCHOFER, *Primary Examiner.*

M. LIEBMAN, *Examiner.*